United States Patent Office 3,264,187
Patented August 2, 1966

3,264,187
PREPARING ATTENUATED CANINE DISTEMPER VIRUS VACCINES BY REPEATED VIRUS SERIAL PASSAGES THROUGH RACCOONS
Eben A. Slater, St. Joseph, Mo., assignor to Research Laboratories, Inc., St. Joseph, Mo., a corporation of Missouri
No Drawing. Filed May 18, 1960, Ser. No. 29,798
1 Claim. (Cl. 167—78)

This invention relates to a new canine distemper vaccine and method of making the same.

Various host animals have been proposed in the past to prepare distemper vaccines, as shown in Green Patent 2,136,131, Green Patent 2,271,818, Green Patent 2,271,819 and Cox Canadian Patent 514,782.

While these past procedures have in some instances proven successful commercially they all have their disadvantages. Thus one procedure requires the use of ferrets as the host animal for attenuation of the virus. This procedure suffers from the disadvantage that ferrets are expensive and in some instances undesirable side reactions occur when the vaccine is inoculated into dogs. It has also been proposed to prepare a canine distemper vaccine by repeated passages of the live virus through avian egg embryos until the virus is avirulent for ferrets. This procedure has the disadvantage that the egg vaccine obtained is notoriously unstable.

It is an object of the present invention to utilize a novel host animal for preparing a canine distemper vaccine.

Another object is to prepare such a vaccine having improved storage properties.

An additional object is to utilize a relatively large and inexpensive host animal for preparing the vaccine.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by utilizing raccoons as the host animal. Raccoons are members of the Procyon family.

The live distemper virus is attenuated by repeated passages through raccoons of the virus obtained from an infected host animal such as a dog, fox, mink, marten, stoat, weasel or other. In general the animals to be immunized can belong to the family Canidae and family Mustelidae.

In general there are employed 10 serial passages through raccoons although more passages up to 50 or even higher can be employed. Preferably at least 20 passages are used.

In a specific example a raccoon was injected with live canine distemper virus obtained from a dog. After 20 days the raccoon was killed, its spleen, heart and liver tissue ground and made into a 5% aqueous emulsion. The emulsion was injected intraperitoneally into another raccoon and this procedure repeated for 25 passages at which time dogs inoculated with the vaccine withstood challenge from an unattenuated live canine distemper virus. When the dogs successfully withstood this challenge the vaccine was harvested from the spleen, heart and liver of the raccoon made into a 5% aqueous emulsion and injected in one cc. doses into dogs to immunize them against distemper.

This procedure has the advantage that the vaccine is stable. Additionally raccoons are a relatively inexpensive host animal and good yields of vaccine are obtained.

The vaccine can be prepared by simply grinding or homogenizing the infected raccoon tissue, e.g. heart, spleen and liver, in a suitable menstruum such as physiological saline, meat infusion, water or the like. The preparation may be further treated in conventional fashion by centrifugation, filtration, extraction, or the like. Also it can be freeze dried or dried under reduced pressure and later reconstituted.

What is claimed is:
In the method of preparing a distemper vaccine the improvement which consists essentially of the following steps:
(1) injecting, into an initial raccoon, of a series of serial passaging raccoons,
(2) an injection of a live virulent donor virus strain of the canine distemper virus complex which has previously been obtained from infected donor animals, which are
(3) members of a pre-selected species of a family of animals susceptible to the canine distemper virus complex pre-selected from other than a species of the Procyonidae family of animals,
(4) killing this initially injected raccoon (1) twenty days after the injection of (2);
(5) removing the spleen, heart and liver tissues,
(6) grinding the removed spleen, heart and liver tissues,
(7) emulsifying the ground spleen, heart, and liver tissues into a 5% aqueous emulsion,
(8) injecting emulsion (7) intraperitoneally into another raccoon, said raccoon constituting another raccoon serial passage level of a series of successive raccoon serial passage levels,
(9) killing each raccoon twenty days after injection (8),
(10) repeating steps (5) (6) (7) (8) (9), for successive raccoon serial passage levels,
(11) inoculating (3) with inoculums of successive serial passage levels of raccoon-passage virus,
(12) challenging the inoculated (3) with challenges of (2),
(13) harvesting, for vaccine preparation, the spleen, heart, and liver tissues selected from those serial passage levels of raccoons wherein, in steps (11) (12), the inoculated (3) successfully withstand challenges of (2),
(14) preparing injectable dosage unit forms containing a 5% aqueous emulsion of harvest (13), as a distemper vaccine for immunizing (3) against the canine distemper virus complex.

References Cited by the Examiner
UNITED STATES PATENTS

| | | | |
|---|---|---|---|
| 2,136,131 | 11/1938 | Green | 167—78 |
| 2,271,818 | 2/1942 | Green | 167—78 |
| 2,271,819 | 2/1942 | Green | 167—78 |
| 2,912,361 | 11/1959 | Froelich | 167—78 |
| 2,965,544 | 12/1960 | Cabasso | 167—78 |

FOREIGN PATENTS 514,782   7/1955   Canada.

OTHER REFERENCES

Austin, "Prospective Experimental Animals for Medical Research," J. Animal Technicians Assoc. 10: 103–108 September 1959.

Belcher "Distemper In Fur Bearing Animals and New Developments in Mink Enteritis," Canad. J. Comp. Med. & Vet. Science, vol. 18, No. 4, pages 120–127, April 1954.

(Other references on following page)

Cabasso "Propagation of Canine Distemper Virus in Suckling Hamsters," Proc. Soc. Exp. Biol. & Med. vol. 88, No. 2, pages 199–202 (#21536), February 1955.

Crook et al. "Egg-Adaption of a Strain of Distemper Virus Isolated from a Raccoon," Am. J. Vet. Res. vol. 19, pages 223–224, January 1958.

Dahr "On the Systematic Position of Phlaocyon Leucosteus Matthew and Some Related Forms," Arkiv for Zoologi, Band 41A No. 11, pages 1–15 (1949).

Goss, "Species Susceptibility to the Virus of Carre' and Feline Enteritis," Am. J. Vet. Res. 9: 65–68 (1948).

Green, "Modification of the Distemper Virus," J.A.V.-M.A., vol. 95, pages 465–466, 469–470, October 1939.

Green "Vaccination of Dogs with a Modified Distemper Virus," Vet. Med. vol. 35, pages 302–304, May 1940.

Green, "Changes in the Virulence of Distemper Virus on Fur Animal Ranches" American Fur Breeder 12(5):12–13 November 1939.

Green, "The Biology of Animal Viruses," Chemistry and Medicine pages 157–184, Edited by Maurice B. Visscher, Univ. of Minn. Press. Minneapolis (1940).

Habermann et al. "Distemper in Raccoons and Foxes Suspected of Having Rabies," J. Am. Vet. Med. Ass'n, vol. 132, No. 1, pages 31–35, January 1, 1958.

Helmboldt et al., "Distemper Complex in Wild Carnivores Simulating Rabies" Am. J. Vet. Res. 16(60): 463–469, July 1955.

Kilham et al., "Isolation of an Agent Causing Bilirubinemia and Jaundice in Raccoons" Proc. Soc. Exp. Biol. and Med. vol. 85, No. 2 February 1954, #20852, pp. 272–275.

Kilham "Serological Studies of Canine Distemper-Complement Fixation with Spleen Antigens" Am. Jour. Vet. Res. vol. 17 (64) pp. 398–401 (1956).

Kilham et al., "Jaundice and Bilirubinemia as Manifestations of Canine Distemper in Raccoons and Ferrets," Am. J. Vet. Res. 17: 144–148, January 1956.

Larin, "Canine Distemper Virus Complex," Nature 173 (4395): 174–176, Jan. 23, 1954.

Robinson et al., "Distemper in the American Raccoon (Procyon Lotor)," J. Am. Vet. Med. Ass. 131(6): 276–278, Sept. 15, 1957.

Warren et al., "The Canine Distemper-Measles Complex," Am. J. Vet. Res. 21(80): 111–119, January 1960.

LEWIS GOTTS, *Primary Examiner.*

MORRIS O. WOLK, *Examiner.*

SHEP K. ROSE, *Assistant Examiner.*